(12) United States Patent
Shi

(10) Patent No.: US 7,986,775 B2
(45) Date of Patent: Jul. 26, 2011

(54) METHOD FOR REALIZING RING BACK TONE IN COMMUNICATION SYSTEM

(75) Inventor: Youzhu Shi, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 937 days.

(21) Appl. No.: 11/875,195

(22) Filed: Oct. 19, 2007

(65) Prior Publication Data

US 2008/0118040 A1 May 22, 2008

Related U.S. Application Data

(63) Continuation of application No. PCT/CN2006/000754, filed on Apr. 21, 2006.

(30) Foreign Application Priority Data

Apr. 21, 2005 (CN) .......................... 2005 1 0034345

(51) Int. Cl.
*H04M 3/00* (2006.01)
(52) U.S. Cl. .......................................... 379/257; 379/69
(58) Field of Classification Search .................. 379/257, 379/69, 201.01, 201.02
See application file for complete search history.

(56) References Cited

U.S. PATENT DOCUMENTS

2002/0111156 A1   8/2002   Roeder

FOREIGN PATENT DOCUMENTS

| CN | 1543231 | 11/2004 |
|---|---|---|
| EP | 1 179 941 A2 | 2/2002 |
| EP | 1 523 199 A1 | 4/2005 |
| WO | 2004/054282 A2 | 6/2004 |

OTHER PUBLICATIONS

European Search Report dated Sep. 3, 2008; Application No./Patent No. 06741698.2-2414 / 1874016 PCT/CN2006000754.

*Primary Examiner* — William J Deane
(74) *Attorney, Agent, or Firm* — Ladas & Parry LLP

(57) ABSTRACT

A method for realizing ring back tone in communication system, enabling that the calling user can only hear the ring back tone triggered by the primary called user no matter whether the call is forwarded or how it is forwarded. In the present invention, service control unit sets a mark indicating not to request ring resource in Invite message initiated to the forward user, and indicating the backward service control unit not to request triggering the ring resource. Optionally, service control unit only sends ringing message forwardly when it receives the backward ringing message and succeeds to request ring resource, and when it receives the backward ringing message, if service control unit has ever initiated call forward, then it deactivates backward ring resource. Optionally, each service control unit requests ring resource respectively, and forwards it when it receives 200 OK, where a mark indicating it coming from ring resource is set; service control unit deactivates backward ring resource, if it finds the mark in the backward 200 OK.

15 Claims, 7 Drawing Sheets

METHOD FOR REALIZING RING BACK TONE IN COMMUNICATION SYSTEM

FIELD OF THE INVENTION

The present invention relates to technologies of ring back tone, and in particular to a method for implementing a ring back tone in a packet core network using the Session Initiation Protocol (SIP) as call control signaling.

BACKGROUND OF THE INVENTION

With the current rapid development of telecommunication technologies, new projects of mobile value-added services for both mobile and fixed phones have emerged continuously to meet increasing personalized demands of mobile users. For instance, Multimedia Message Services (MMS), Interactive Voice Response (IVR), voice short message, etc. have emerged as value-added services for mobile phones. Moreover, the color ring back tone service established since 2003 has brought a further increased Average Revenue Per Unit (APRU) to telecommunication operators.

The color ring back tone service, also referred to as a personalized ring back tone service, is such a service that can be subscribed to by a user for providing a caller user with a segment of musical song or another audio record instead of an ordinary ring back tone. With subscription to the color ring back tone service, a customer can set a personalized ring back tone freely, and while this user is being called, a musical song or another audio record subscribed to in such a personalized way, instead of an ordinary ring back tone, can be played for the caller user. Specifically, a personalized ring back tone can be any segment of music, song, audio record, video, etc. In the case of video, a terminal of the caller user is required to be capable of playing video media for the purpose of proper experience, and the service is also referred to as a multimedia color ring back tone or color video service. Essentially, an ordinary ring back tone and a color ring back tone including a multimedia color ring back tone each are a controlled media resource in a packet domain, and thus in the present specification, are collectively called a "ring back tone", and their corresponding media resources are collectively called a "ring tone resource".

On the other hand, in value-added services for fixed phones, call forwarding is a common service which was early put into use, and specifically refers to that for a subscriber to this service, an incoming call, which has not been answered by the subscriber (original called user), can be forwarded to another user (forward-to user) or a voice mail. The call forwarding service includes but is not limited to Call Forwarding Unconditional, Call Forwarding on Busy, Call Forwarding on No Reply, etc. The Call Forwarding on No Reply refers to that any incoming call for a subscriber to the service, which has not been answered within a specified time limit, is forwarded automatically to a pre-specified number. The Call Forwarding on Busy refers to that an incoming call for a subscriber to the service on busy can be forwarded automatically to another specified number. Such a service allows an incoming call for a subscriber to be forwarded to another number. The Call Forwarding Unconditional refers to that any incoming call for a subscriber to the service can be forwarded automatically to a pre-specified number despite the status of the called subscriber. The call forwarding service can satisfy the requirement of a user for flexible processing of an incoming call, and thus increasingly win the favor of various users.

In the present specification, a destination user called by a caller user will be referred to as a "called user" regardless of whether call forwarding occurs during the call. A forwarding destination user for the called user with which the call forwarding occurs and a further forwarding destination user for the forwarding destination user with which further call forwarding occurs will be collectively referred to as a "forward-to user".

However, some problems may arise from the combination of the call forwarding service with a new value-added service, for instance, the combination of the call forwarding service with a color ring back tone service. By way of example, a caller user A calls a called user B who has subscribed to a color ring back tone service and for whom a call forwarding service has been activated, and thus the call from the caller user A is forwarded to a forward-to user C who has also subscribed to a color ring back tone service. The forward-to user C accepts the call, and consequently his terminal rings. In such a case, both the called user B and the forward-to user C have subscribed to a color ring back tone service, resulting in a problem that a color ring back tone subscribed to by which of the users shall be played for the caller user A.

At present, a simplest solution to this problem is that a caller user is made to always hear a color ring back tone subscribed to by a final forward-to user despite how a call has been forwarded. In other words, in the above example, the caller user A hears a color ring back tone subscribed to by the forward-to user C.

In practical operation, however, an operator may require that a caller user hear a color ring back tone subscribed to by an original called user despite how a call has been forwarded. In other words, in the above example, the call user A shall hear a color ring back tone subscribed to by the called user B. Even if the called user B has not subscribed to the color ring back tone service, but the forward-to user C has subscribed to the color ring back tone service, the caller user A will hear an ordinary ring back tone instead of a color ring back tone subscribed to by the forward-to user C.

The operator has such a requirement because the color ring back tone service is a subscribed service which serves a called user, but it is a caller user that experiences the service. The caller user calls a familiar called user, and during connecting of the call, he is generally not aware that the call has been forwarded. When hearing a color ring back tone subscribed to by a final forward-to user, the caller user may be puzzled or even think that he has dialed a wrong number and hence hang up. Additionally, in the case that the activated call forwarding is the Call Forwarding on No Reply, the terminal of the original called user actually have been connected and thus rung, and the caller user may have heard a color ring back tone (or an ordinary ring back tone) triggered by the original called user. Only when there is no reply after the terminal of the original called user has rung for a period of time, the call will be forwarded. If the caller user is made to hear a color ring back tone subscribed to by the final forward-to user, such a switching of color ring back tone may bring an unpleasant service experience to him/her.

As can be seen, a good service experience can be provided for the caller user in the event that "regardless of how a call has been forwarded, when the call is put through, that is, a terminal of a forward-to user rings, the caller user can always hear a color ring back tone or an ordinary ring back tone triggered by the original called user until the call is answered for a talk or fails", as desired by the operator.

However, in a current packet core network using the SIP as call control signaling, there is no standard call flow available for such a service. Thus there is a need for development of a solution to this service in a packet core network using the SIP as call control signaling.

SUMMARY OF THE INVENTION

In view of the above, a main object of the invention is to provide a method for implementing a ring back tone in a communication system, so that a caller user only hears a ring back tone triggered by an original called user regardless of whether a call is forwarded and how the call is forwarded.

To achieve the above object, the invention provides a method for implementing a ring back tone in a communication system, wherein a packet core network of the communication system uses the Session Initiation Protocol as call control signaling, and a service control element provides various service logic control functions for a registered user, the method including:

in the case that call forwarding needs to be initiated, initiating, by the service control element of a called user or a forward-to user, to a backward side a call request message for a call to be forwarded, in which a first flag indicating no ring tone resource is to be requested is set;

transferring, by the service control element of the forward-to user, a media-setting-up response code received from the backward side to a forward side; and upon receiving the media-setting-up response code from the backward side, if no ring back tone is being played for a caller user, requesting, by the service control element of the called user, a ring tone resource from a media resource control element, and playing a ring back tone for the caller user.

Preferably, the first flag is set in a Reject-Contact header of an Invite message representative of a call request.

Preferably, the first flag is described in a way of "description="<RBT>"", where "RBT" is an extension to the Session Initiation Protocol, indicative of a ring tone resource.

Preferably, the first flag is set in a header or a parameter, indicative of call forwarding information, in an Invite message representative of a call request.

Preferably, the header or the parameter indicative of the call forwarding information is a Referred-By header or a History-Info header.

Preferably, the caller user, the called user and the forward-to user use the same or different types of terminals, which are one of:

a fixed phone, an Integrated Services Digital Network terminal, a Session Initiation Protocol terminal, an H.323 terminal, a Softphone, a Global System for Mobile communication mobile phone, a Code Division Multiple Access mobile phone, The Third Generation mobile communication phone, a Wireless Local Area Network terminal, and a Personal Handyphone System terminal.

Preferably, the method further includes: when the terminal of the caller user does not support the Session Initiation Protocol, performing, by a network access node or a media gateway control element, a translation between a protocol other than the Session Initiation Protocol and the Session Initiation Protocol for messages associated with the terminal; and when the terminal of the called user or the forward-to user does not support the Session Initiation Protocol, performing, by the network access node, a translation between a protocol other than the Session Initiation Protocol and the Session Initiation Protocol for messages associated with the terminal.

The invention provides another method for implementing a ring back tone in a communication system, wherein a packet core network of the communication system uses the Session Initiation Protocol as call control signaling, and a service control element provides various service logic control functions for a registered user, the method including:

A. upon receiving a call request message from a forward side, if a user terminal is idle and permits a direct incoming call, sending, by the service control element of a called user or a forward-to user, the call request message to the user terminal, and requesting a ring tone resource from a media resource control element; and upon receiving a ring message from the user terminal and an answer response message indicative of a successful request for the ring tone resource, sending to the forward side a ring message representative of the ring tone resource;

B. upon receiving the ring message from a backward side, deactivating, by the service control element, the ring tone resource from the backward side, and if no ring back tone is being played for a caller user, requesting a ring tone resource from the media resource control element, and upon receiving an answer response message indicative of a successful request for the ring tone resource, sending to the forward side a ring message representative of the ring tone resource; and C. upon receiving the ring message from the backward side, instructing, by a media control device of the caller user, to open a media channel to receive a ring back tone from the backward side.

Preferably, the method further includes: before the service control element of the called user or the forward-to user sends to the forward side the ring message, determining whether Session Description Protocol description of other media has been sent to the forward side, and if the Session Description Protocol description of other media has been sent to the forward side, amending for the forward side a remote media to be Session Description Protocol description of a ring tone resource requested by the local.

Preferably, the step of deactivating the ring tone resource from the backward side includes:

in a reInvite message or an Update message sent to the backward side, amending a media direction in the Session Description Protocol description for the caller user such that a media direction attribute is amended to be "sendonly" indicating that the caller user only sends but does not receive a media stream, or "inactive" indicating that the caller user disables a media stream.

Preferably, the method further includes: upon receiving a 200 OK answer response message from a non-ring tone resource media responding to the call request, transferring, by the service control element of the called user or the forward-to user, the 200 OK answer response message to the forward side, thus establishing a session between the caller and the media.

Preferably, the 200 OK answer response message is one of: a user answer, a voice mail answer and various voice notifications of incoming call failure.

Preferably, the method further includes: before the service control element of the called user or the forward-to user transferring the 200 OK answer response message to the forward side, determining whether the Session Description Protocol description of other media has been sent to the forward side, and if the Session Description Protocol description of other media has been sent to the forward side, amending for the forward side the remote media to be Session Description Protocol description of the non-ring tone resource media.

Preferably, in step A, upon receiving the call request message from the forward side, the service control element of a user that finally rings sends the call request message to the user, and then requests the ring tone resource from the media resource control element after receiving the ring message indicating that the terminal rings.

Preferably, in step A, upon receiving the call request message from the forward side, the service control element of a user that finally rings requests the ring tone resource from the media resource control element, sends the call request message to the user after the ring tone resource has been requested successfully but without playing the requested ring tone resource, and plays the requested ring tone resource after receiving the ring message indicating that the terminal rings.

Preferably, the caller user, the called user and the forward-to user use the same or different types of terminals, which are one of:

a fixed phone, an Integrated Services Digital Network terminal, a Session Initiation Protocol terminal, an H.323 terminal, a Softphone, a Global System for Mobile communication mobile phone, a Code Division Multiple Access mobile phone, The Third Generation mobile communication phone, a Wireless Local Area Network terminal, and a Personal Handyphone System terminal.

Preferably, when the user terminal of the caller user, the called user and/or the forward-to user does not support the Session Initiation Protocol, a network access node performs a translation between a protocol other than the Session Initiation Protocol and the Session Initiation Protocol for messages associated with the terminal.

Preferably, the media control device of the caller user is the terminal, the network access node or the media gateway control element of the caller user.

The invention provides still another method for implementing a ring back tone in a communication system, wherein a packet core network of the communication system uses the Session Initiation Protocol as call control signaling, and a service control element provides various service logic control functions for a registered user, the method including:

upon succeeding in requesting a ring tone resource from a media resource control element, sending, by the service control element of a called user or a forward-to user, to a forward side a media-setting-up response code in which a second flag is set indicative of a response from a ring tone resource;

parsing, by the service control element, the received media-setting-up response code, determining whether the second flag is contained, and if the second flag is contained, deactivating a ring tone resource at a backward side; and upon receiving the media-setting-up response code, instructing, by a media control device of a caller user, to open a media channel to receive a ring back tone from the backward side.

Preferably, the second flag is set in a Contact header of the media-setting-up response code, and is described in terms of User Agent Capabilities of a message source.

Preferably, the second flag is described in a way of "description="<RBT>"", where "RBT" is an extension to the Session Initiation Protocol, indicative of a ring tone resource.

Preferably, the step of deactivating the ring tone resource from the backward side includes:

in a reInvite message or an Update message sent to the backward side, amending a media direction in the Session Description Protocol description for the caller user such that a media direction attribute is amended to be "sendonly" indicating that the caller user only sends but does not receive a media stream, or "inactive" indicating that the caller user disables a media stream.

Preferably, the caller user, the called user and the forward-to user use the same or different types of terminals, which are one of:

a fixed phone, an Integrated Services Digital Network terminal, a Session Initiation Protocol terminal, an H.323 terminal, a Softphone, a Global System for Mobile communication mobile phone, a Code Division Multiple Access mobile phone, The Third Generation mobile communication phone, a Wireless Local Area Network terminal, and a Personal Handyphone System terminal.

Preferably, the method further includes: when the terminal of the caller user does not support the Session Initiation Protocol, performing, by a network access node or a media gateway control element, a translation between a protocol other than the Session Initiation Protocol and the Session Initiation Protocol for messages associated with the terminal; and when the user terminal of the called user or the forward-to user does not support the Session Initiation Protocol, performing, by the network access node, a translation between a protocol other than the Session Initiation Protocol and the Session Initiation Protocol for messages associated with the terminal.

Preferably, the media control device of the caller user is the terminal, the network access node or the media gateway control element of the caller user.

Preferably, in step B:

upon receiving the media-setting-up response code, if no ring back tone is being played for the caller user, the service control element of the called user requests the ring tone resource from the media resource control element, and plays a ring back tone for the caller user.

To sum up, among the three solutions according to the invention, the essence of the first solution lies in that the service control element sets a flag in the Invite message for forwarding a call initiated to the forward-to user, indicating no ring tone resource is to be requested, and instructing the service control element at the backward side not to request for triggering a ring tone resource. This flag may be set in the Reject-Contact header, or represented as a header or a parameter indicative of call forwarding information, such as the Referred-By header and the History-Info header.

The essence of the second solution lies in that the service control element of the called user or the forward-to user sends a ring message to the forward side only when receiving a ring message from the backward side and a ring tone resource is requested successfully. Upon receiving the ring message from the backward side, the service control element deactivates the ring tone resource from the backward side if it has initiated the call forwarding. Upon receiving the ring message from the backward side, the media control device of the caller user issues an instruction to open a media channel to listen to a ring back tone from the backward side. When receiving from the backward side a 200 OK response message answering to the call request (i.e. responding to the Invite message), which is indicative of a response from a media other than a ring tone resource (such as a user answer, a voice mail answer and various voice notifications of incoming call failure), the service control element sends or transfers the 200 OK answer response to the forward side, thus establishing a session between the caller user and the media.

The essence of the third solution lies in that the service control element of the called user or the forward-to user requests for a ring tone resource, and upon receiving the 200 OK message from the media resource control element, forwards the 200 OK message with a flag being set therein, which indicates that the response message is from a ring tone resource. The service control element of the called user or the forward-to user deactivates the ring tone resource from the backward side if the flag is found in the 200 OK message from the backward side. This flag may be set in the Contact header.

The above three solutions each refrain the ring tone resource requested by the forward-to user (the ring tone resource of the forward-to user is not triggered or is deactivated after having been requested), and thus only the ring tone resource of the original called user can be played for the caller user in the end, thus satisfying the service demand "regardless of how a call has been forwarded, when the call is put through, that is, a terminal of a forward-to user rings, the caller user can always hear a color ring back tone or an ordinary ring back tone triggered by the original called user until the call is answered for a talk or fails". In this way, the caller user can be brought a good service experience, and will neither hear a strange color ring back tone nor confront a switching of the color ring back tone he is listening to upon call forwarding.

DETAILED DESCRIPTION OF THE EMBODIMENTS

For better understanding of the objects, solutions and advantages of the invention, the invention is further detailed hereinafter with reference to the drawings.

Three solutions according to the invention can be applied in a packet core network using the SIP as call control signaling. First, the structure of the packet core network using the SIP as call control signaling to which embodiments of the invention can be applied will be described in general, and then the solutions each will be described in connection with principles and then the embodiments thereof.

Figure 1:
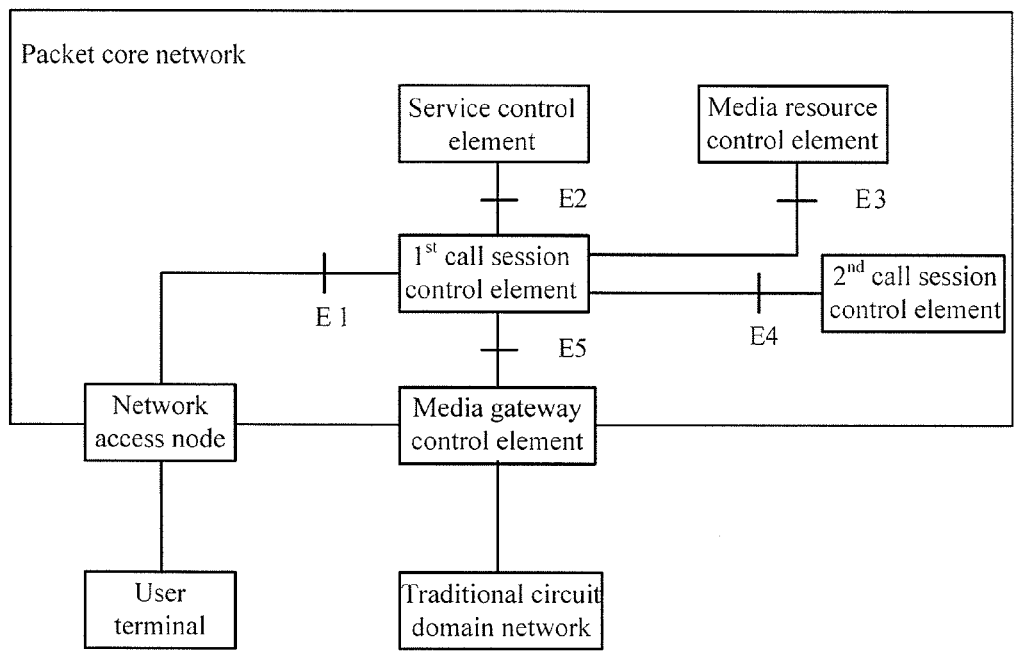
FIG. 1 is a schematic diagram of a communication system to which the invention can be applied.

FIG. 1 illustrates a communication system to which a method for implementing a ring back tone according to the embodiments of the invention can be applied, including a user terminal, a network access node, a first call session control element, a second call session control element, a service control element, a media resource control element, a media gateway control element, etc. A packet core network of the communication system uses the Session Initiation Protocol as call control signaling.

The user terminal is any communication terminal accessible to the packet core network, such as a traditional fixed phone, an Integrated Services Digital Network (ISDN) terminal, a Session Initiation Protocol (SIP) terminal, an H.323 terminal, a Softphone, a Global System for Mobile communication (GSM) mobile phone, a Code Division Multiple Access (CDMA) mobile phone, a Third Generation (3G) mobile communication phone, a Wireless Local Area Network (WLAN) terminal and a Personal Handyphone System (PHS).

The network access node is a network node providing the user terminal with functions of the packet core network, such as registration, certification and authentication, and performs a translation between the SIP and another access protocol. Through the network access node, the user terminal can be registered with different call session control elements and service control elements.

The first and second call session control elements provide functions of call controlling, routing, etc. for a registered user accessed to the packet core network, and can trigger a call to the service control element. An E4 interface between the two call session control elements is the SIP.

The service control element provides various service logic control functions for a registered user accessed to the packet core network, and provides a host execution environment for various services. In the packet core network, there may be a plurality of service control elements processing different services.

The media resource control element provides for a registered user accessed to the packet core network control functions of requisition, application, release, etc. of various media resources, such as signal tone and voice notification resource, conference resource and number receiving resource.

The media gateway control element provides an interworking control function for a mutual call of a registered user accessed to the packet core network and another traditional circuit-domain network user, and performs a translation between the SIP and another call control protocol.

Furthermore, an E1 interface between the network access node and the first call session control element is the SIP when the network access node and the first call session control element are different physical entity devices, and is the SIP or a self-defined internal interface when the network access node and the first call session control element are integrated in the same physical entity device.

An E2 interface between the network control element and the first call session control element is the SIP when they are different physical entity devices, and is the SIP or a self-defined internal interface when they are the same physical entity device.

An E3 interface between the media resource control element and the first call session control element is the SIP when they are different physical entity devices, and is the SIP or a self-defined internal interface when they are the same physical entity device.

The E4 interface between the first and second call session control elements is the SIP.

An E5 interface between the media gateway control element and the first call session control element is the SIP when they are different physical entity devices, and is the SIP or a self-defined internal interface when they are the same physical entity device.

The communication system to which the method for implementing a ring back tone according to the embodiments of the invention can be applied has been described as above, and then the three solutions according to the invention will be described respectively below.

The principle of the first solution according to the invention will be described. When the service control element of a user with which call forwarding occurs initiates a forwarded call to a forward-to user, it is described in a Reject-Contact header carried in an Invite message that the caller user rejects to be connected to a ring tone resource at the backward side. The service control element of the forward-to user receives and parses the Invite message to obtain the description in the Reject-Contact header, and hence does not request a ring tone resource for the caller user. The description in the Reject-Contact header can be made through but not limited to the following way:

description="<RBT>", where RBT (RingBackTone) is a protocol extension indicative of a ring tone resource.

Alternatively, a Referred-By header indicative of call forwarding information is carried in the Invite message. The service control element of the forward-to user receives and parses the Invite message to obtain the Referred-By header, and hence does not request a ring tone resource for the caller user.

Figure 2:
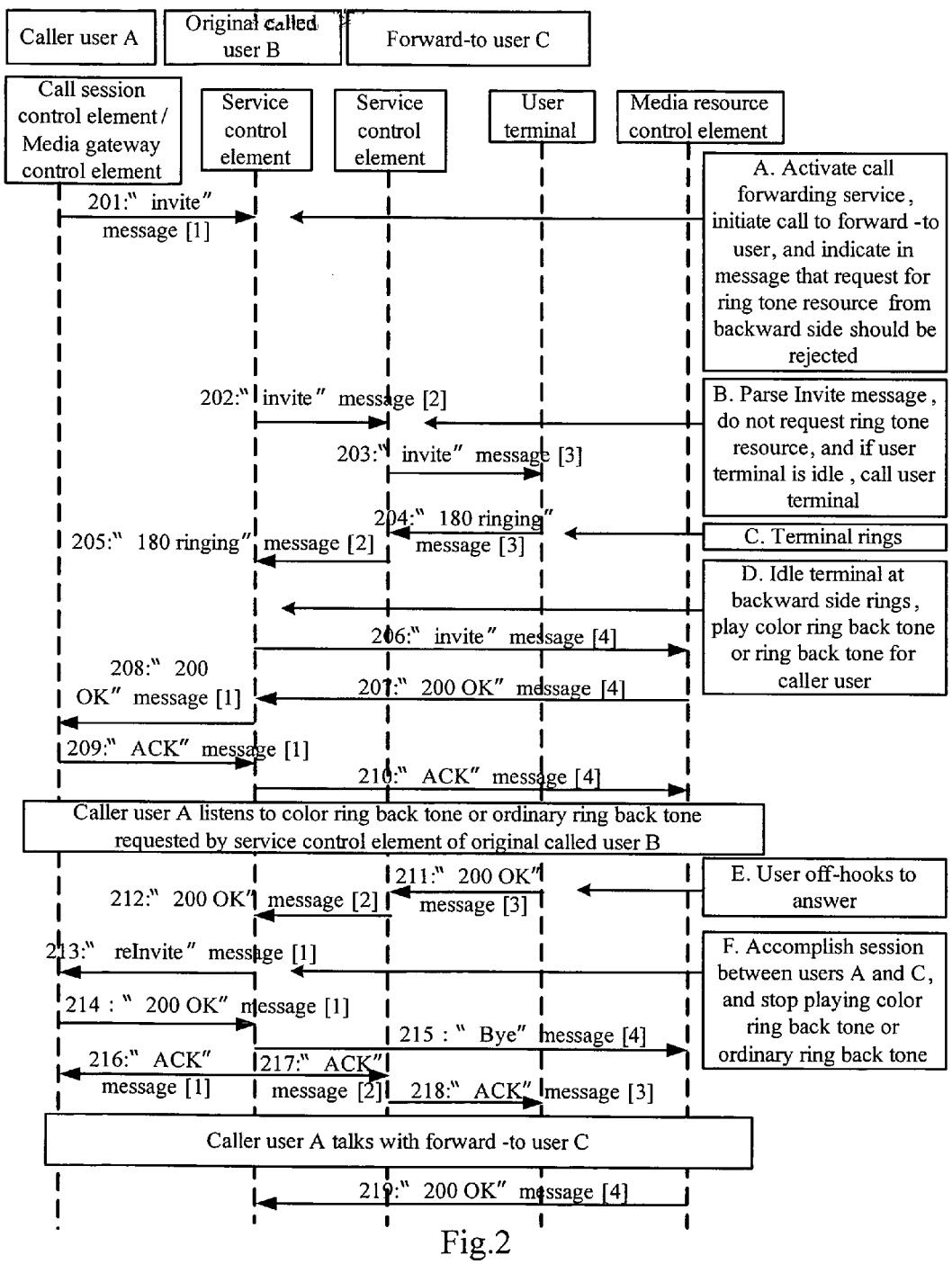
FIG. 2 is a flow chart of a method for implementing a ring back tone in the communication system according to a first embodiment of the invention.

A first embodiment according to the invention is illustrated in FIG. 2. In step 201, a caller user A initiates a call, i.e., sends an Invite message [1] to a called user B. The caller user A may be a user of a packet core network or a traditional circuit domain. It shall be noted that each number in the square brackets indicates a different session, for instance, [1] for a first session, and [2] for a second session.

If the original called user B does not answer, then as illustrated in FIG. 2, a call forwarding service is activated, and a call is initiated to a forward-to user, where it is indicated in a message that a request for a ring tone resource by a backward side is rejected. That is, step 202 is performed, where the called user B sends an Invite message [2] to the service control element of a forward-to user C.

In the Reject-Contact header of the SIP Invite message, caller preferences of the caller user A are described, indicating that the caller user A rejects a contact with a ring tone resource, i.e. indicating to a service control element at the backward side that no connection to a ring tone resource is to be requested. The specific description can be made through but not limited to the following way: description="<RBT>", where RBT (RingBackTone) is a protocol extension indicative of a ring tone resource.

Alternatively, it may be described in the Referred-By header of the SIP Invite message that this is a forwarded call initiated from the called user B.

In step 203, the service control element of the forward-to user C sends an Invite message [3] to the user terminal. In other words, the call arrives at the service control element of the forward-to user C in this step. The service control element parses the Invite message, and in accordance with the description of the preferences of the caller user A in the Reject-Contact header, does not request for triggering a color ring back tone or ordinary ring back tone associated with the forward-to user C. Alternatively, the service control element knows from the Referred-By header that this is a forwarded call, and thus does not request for triggering a color ring back tone or ordinary ring back tone associated with the forward-to user C. If the terminal of the forward-to user C is idle and permits an incoming call, the user terminal may be called directly.

In step 204, the user terminal of the forward-to user C rings and feeds back a 180 Ringing message [3] to the service control element of the forward-to user C.

In step 205, the service control element of the forward-to user C transfers a 180 Ringing message [2] to the service control element of the original called user B.

In step 206, the service control element of the original called user B receives the 180 Ringing response message, thus knowing that an idle terminal at the backward side rings, and determines whether a ring back tone has been played for the caller user (in the event of the Call Forwarding on No Reply, the called user B has already played its own ring back tone for the caller user A). If a ring back tone has been played for the caller user, the service control element waits for the forward-to user C to trigger step 211, otherwise sends an Invite message [4] to the media resource control element, requesting for the caller user A a color ring back tone or ordinary ring back tone associated with the called user B.

In step 207, the media resource control element feeds back a 200 OK message [4] to the service control element of the original called user B.

In step 208, the service control element of the original called user B transfers a 200 OK message [1] to the caller user A.

In step 209, the caller user A sends an ACK message [1] to the service control element of the original called user B.

In step 210, the service control element of the original called user B transfers the ACK message [4] to the media resource control element, and the caller user A begins to listen to the color ring back tone or ordinary ring back tone associated with the original called user B.

In step 211, the user terminal of the forward-to user C sends a 200 OK message [3] to the service control element.

In step 212, the service control element of the forward-to user C sends a 200 OK message [2] to the service control element of the original called user B.

In step 213, the original called user B sends a reInvite message [1] to the caller user A.

In step 214, the caller user A sends a 200 OK message [1] to the original called user B.

In step 215, the original called user B sends a BYE message [4] to the media resource control element.

In step 216, the original called user B sends an ACK message [1] to the caller user A.

In step 217, the original called user B sends an ACK message [2] to the forward-to user C.

In step 218, the service control element of the forward-to user C sends an ACK message [3] to the user terminal.

Thereafter, the caller user A is engaged in a talk with the forward-to user C.

In step 219, the media resource control element sends a 200 OK message [4] to the original called user B.

In other words, steps 211 to 219 represent the procedures in which the forward-to user C answers, the service control element of the original called user B stops playing the ring tone, and the sessions between the users A and C are thus completed.

Hereinafter, the principle of the second solution according to the invention is described.

In the packet core network using the SIP as call control signaling, an agreement is made in advance that: receipt of a 180 Ringing response message from the backward side by a caller user or a user with which call forwarding occurs means that at the backward side, a ring tone resource is played and an idle terminal rings, and receipt of a 200 OK response message responding to a call request (i.e. an Invite message) from the backward side is indicative of a response from a media other than a ring tone resource (such as a user answer, a voice mail answer and various voice notifications of incoming call failure). The following steps are included particularly.

Firstly, when the service control element of a called user with which no call forwarding occurs processes an incoming call, an Invite request is initiated respectively to the user terminal of the called user and the media resource control element by means of a Back-to-Back User Agent (B2BUA). Only after the terminal rings, the 180 Ringing response message is received and the request for a ring tone resource succeeds, the 180 Ringing message is sent to the forward side, indicating that at the backward side, a ring tone resource is played and an idle terminal rings.

Secondly, when receiving the 180 Ringing response message, the service control element of the user with which call forwarding occurs understands that at the backward side, an idle terminal rings and a ring tone resource is played, and then the service control element deactivates the ring tone resource from the backward side through but not limited to the following way.

A media direction in the Session Description Protocol (SDP) description for the caller in a reInvite message or an Update message is amended. The media direction attribute is amended to be "sendonly" indicating that the caller only sends but does not receive a media stream, or "inactive" indicating that the caller disables a media stream.

In the event that the service control element does not request for playing a ring tone resource for the caller user prior to initiation of the call forwarding (in other words, the call forwarding that occurs is not the Call Forwarding on No Reply), the media resource control unit is requested to play for the caller user a color ring back tone or ordinary ring back tone associated with the user. Upon success of the request, a 180 Ringing message is sent to the forward side indicating that an idle terminal rings and the ring tone resource is played. At this point, the remote media shall be amended for the forward side to be the SDP description of the ring tone resource requested by the local if the SDP description of other media has been sent to the forward side.

Thirdly, when receiving a 200 OK response, which is a final answer to a call, from a media other than a ring tone resource (such as a user answer, a voice mail answer and various voice notifications of incoming call failure), the service control element of the called user with which no call forwarding occurs or of a user with which call forwarding occurs sends or transfers to the forward side the 200 OK answer response, thus establishing a session between the caller and the media. At this point, the remote media shall be amended for the forward side to be the SDP description of the media if the SDP description of other media has been sent to the forward side.

Fourthly, the caller user receives the 180 Ringing message, and opens a media channel to listen to the color ring back tone or ordinary ring back tone requested by the backward side.

The second solution according to the invention is universally applicable, and the service control element of a called user may process a forwarded call and an ordinary call in the same way. In other words, this solution is a "package" solution regardless of whether the call forwarding occurs and how many times it occurs.

Figure 3A:
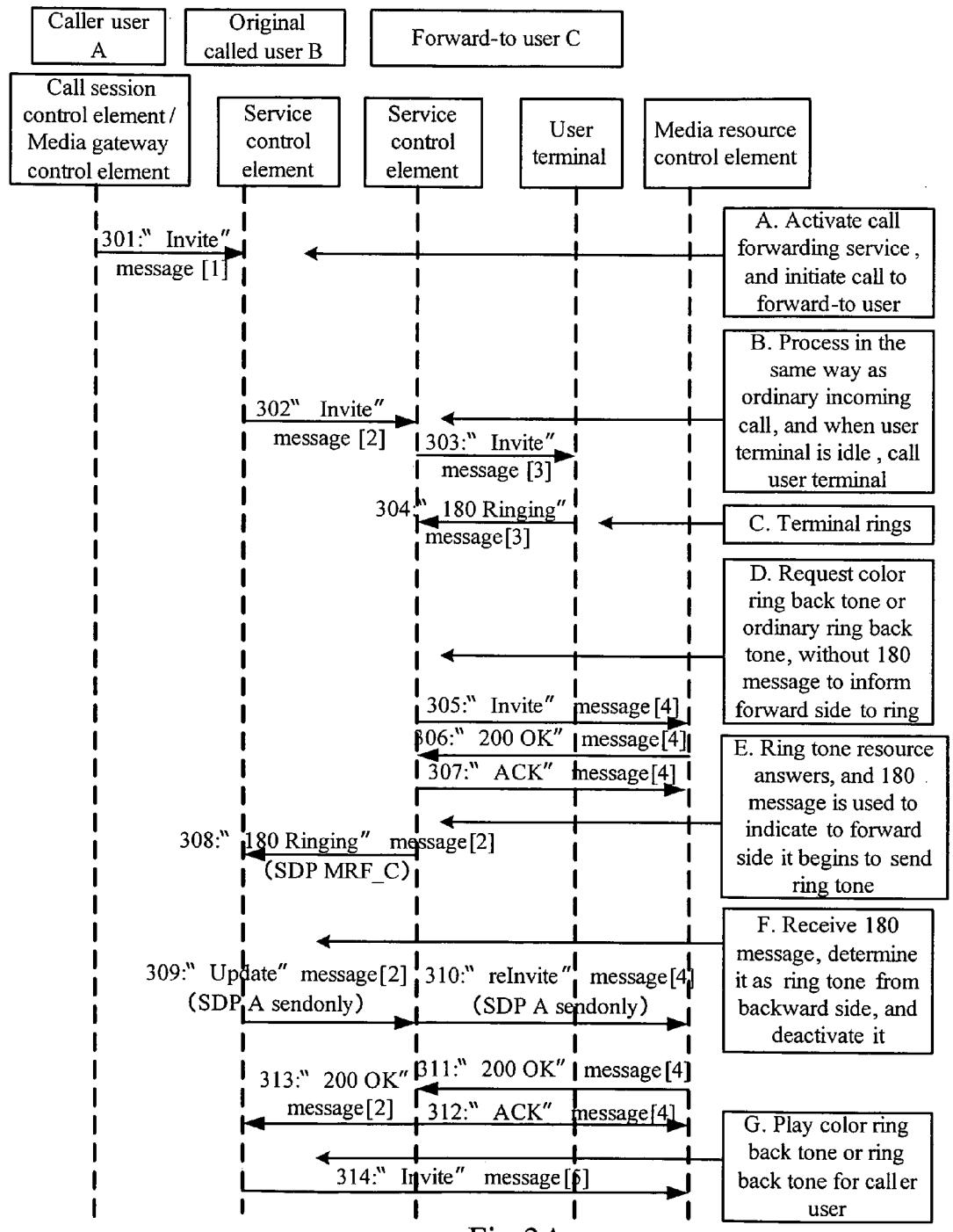
FIG. 3 is a flow chart of a method for implementing a ring back tone in the communication system according to a second embodiment of the invention.
Figure 3B:
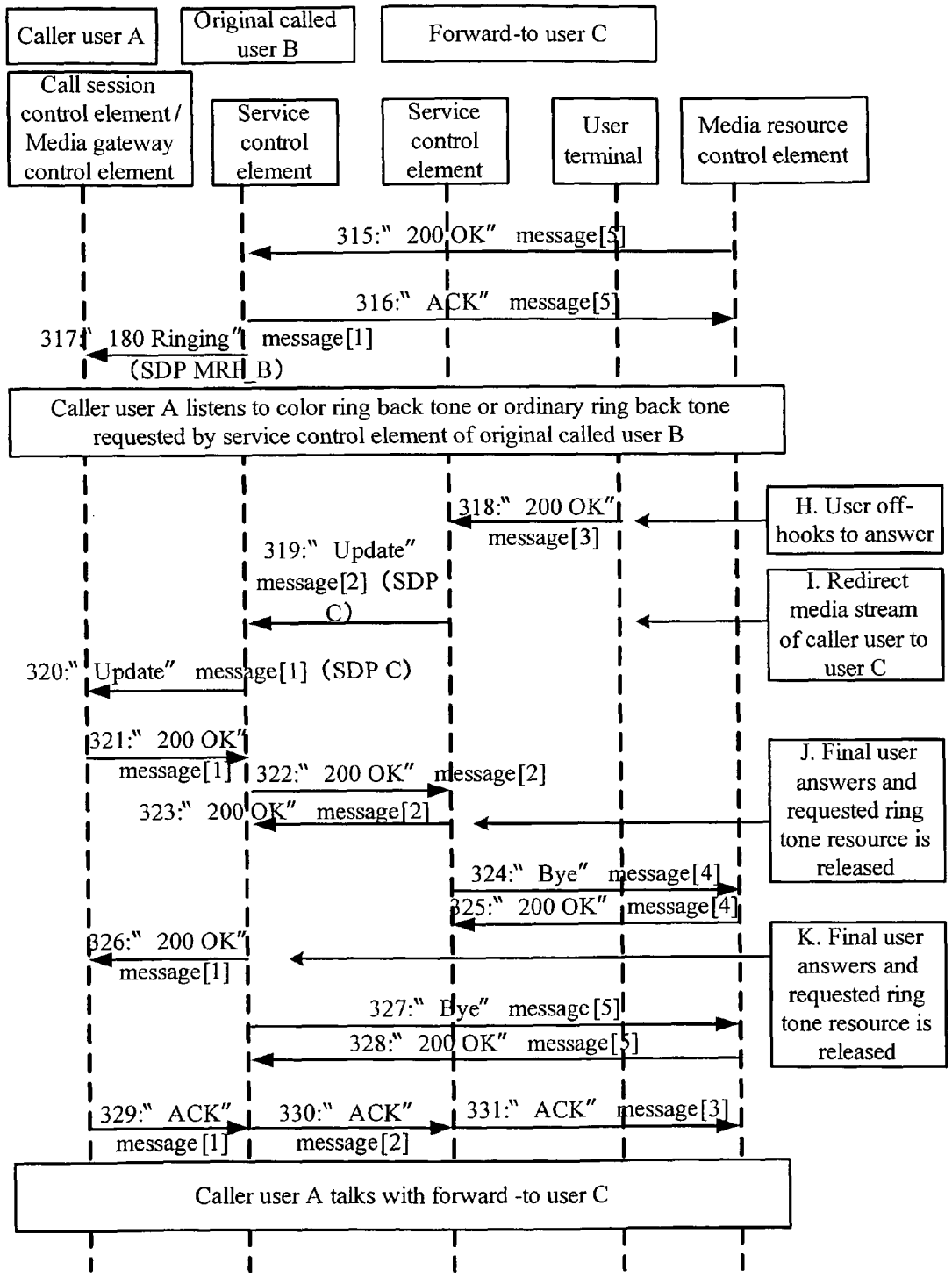

A second embodiment according to the invention is illustrated in FIG. 3A and FIG. 3B. In step 301, a caller user A sends to a called user B an Invite message [1] initiating a call. The user A may be a user of a packet core network or traditional circuit domain.

In step 302, the call arrives at the service control element of the user B, and if the user B does not answer, the call forwarding service is activated, and an Invite message [2] initiating a call is sent to the service control element of a forward-to user C.

In step 303, the service control element of the forward-to user C processes the call in the same way as a normal incoming call, and if the user terminal is idle, sends an Invite message [3] to the user terminal.

In step 304, the user terminal of the user C rings and feeds back a 180 Ringing message [3] to the service control element.

In step 305, the service control element of the user C receives the 180 Ringing message [3] indicating that the called terminal rings, and does not transfer immediately to the forward side a 180 Ringing message informing that the idle terminal rings, but instead requests a color ring back tone or ordinary ring back tone associated with the user C, that is, sends an Invite message [4] to the media resource control element.

In step 306, the media resource control element feeds back a 200 OK message [4] to the service control element.

In step 307, the service control element of the user C feeds back an ACK message [4] to the media resource control element.

In step 308, the service control element of the user C receives an answer for the ring tone resource, and sends to the forward side a 180 Ringing message [2] indicating that an idle terminal rings and a ring tone resource is played, where SDP description of the ring tone resource associated with the user C is carried in the response message.

In step 309, when receiving the 180 Ringing message [2], the service control element of the original called user B understands that at the backward side, an idle terminal rings and a ring tone resource is played, and the service control element of the original called user B deactivates the ring tone resource from the backward side through but not limited to the following way.

In an Update message [2] sent to the service control element of the forward-to user C, a media direction attribute in the SDP for the caller user A is amended to be "sendonly" indicating that the caller user only sends but does not receive a media stream, or "inactive" indicating that the caller user disables a media stream.

In step 310, the service control element of the forward-to user C sends to the media resource control element a reInvite message [4], which carries the amended SDP description for the caller user A, to deactivate the ring tone resource.

In step 311, the media resource control element receives the reInvite message [4], and in accordance with the media stream direction in the SDP, issues an instruction that no media stream (ring tone resource) is to be sent to the caller user A. As illustrated, a 200 OK message [4] is fed back.

In step 312, the service control element of the user C sends an ACK message [4] to the media resource control element.

In step 313, the service control element of the user C feeds back a 200 OK message [2] responding to the Update message [2]. The deactivation is thus completed. Since the ring tone resource requested by the service control element of the forward-to user has been deactivated, only the ring tone resource of the called user is played for the caller user in the end, thus satisfying the service demand "regardless of how a call has been forwarded, when the call is put through, that is, a terminal of a forward-to user rings, the caller user can always hear a color ring back tone or an ordinary ring back tone triggered by the original called user until the call is answered for a talk or fails".

In step 314, the service control element of the original called user B sends an Invite message [5] to the media resource control element, requesting for triggering the color ring back tone or ordinary ring back tone associated with the user B. If the caller user has already been listening to the color ring back tone or ordinary ring back tone requested by the service control element of the original called user B, in other words, the call forwarding caused previously by the service control element is the Call Forwarding on No Reply, then steps 314 to 317 are skipped.

In step 315, the media resource control element sends a 200 OK answer message [5] to the service control element of the original called user B.

In step 316, the service control element of the original called user B returns an ACK message [5] to the media resource control element.

In step 317, the service control element of the original called user B sends to the caller user A a 180 Ringing message [1], also indicating that at the backward side, an idle terminal rings and a ring tone is played. However, what is carried in the message is the SDP description of the ring tone resource associated with the user B. The caller user receives the 180 Ringing response message [1], opens a media channel, and begins to listen to the color ring back tone or ordinary ring back tone requested by the service control element of the original called user B.

In step 318, the forward-to user C answers, and a final 200 OK message [3] is sent for the session request.

In step 319, the service control element of the forward-to user C redirects the media stream of the caller user A to the user C (because carried in the previous 180 Ringing message [1] is the SDP description of the ring tone resource associated with the user C), and sends an Update message carrying the SDP description for the user C.

In step 320, the service control element of the original user B transfers to the caller user an Update message [1] carrying the SDP description for the user C.

In step 321, the caller user returns a 200 OK message [1] responding to the Update message [1].

In step 322, the service control element of the original called user B transfers to the service control element of the forward-to user C an 200 OK message [1] responding to the Update message [1].

In step 323, the service control element of the forward-to user C sends to the forward side a final 200 OK message [2] for the session request, and releases the ring tone resource requested by itself.

In steps 324 to 325, the ring tone resource requested by the service control element of the forward-to user C is released. Specifically, the media resource control element receives a BYE message [4] from the service control element, and feeds back a 200 OK message [4].

In step 326, the service control element of the original called user B transfers to the caller user a final 200 OK message [1] for the session request, and releases ring tone resource requested by itself.

In steps 327 to 328, the ring tone resource requested by the service control element of the original called user B is released. Specifically, the media resource control element receives a BYE message [5] from the original called user B, and feeds back a 200 OK message [5].

In steps 329 to 331, the caller user A sends an ACK message [1] to the original called user B, the original called user B sends an ACK message [2] to the service control element of the forward-to user C, and the service control element of the forward-to user C sends an ACK message [3] to the media resource control element. The caller user A is thus engaged in a talk with the user C.

As can be seen, the service control element of the user C does not distinguish between a forwarded incoming call and a non-forwarded incoming call. Thus this solution is equally applicable to a call which has not been forwarded: the service control element of the called user receives an incoming call request; if the user terminal is idle, permitting a direct incoming call, steps 303 to 308 are performed; and the caller user receives a 180 Ringing message, opens the media channel and listens to the color ring back tone or ordinary ring back tone requested by the service control element of the called user.

The service control element of the called user may call the user terminal first, and when the terminal rings, request the ring tone resource, or may request the ring tone media resource first but may not play it immediately, in other words, may not play it until the terminal rings. This solution is equally applicable to the latter situation, as in a third embodiment of the invention.

Figure 4:
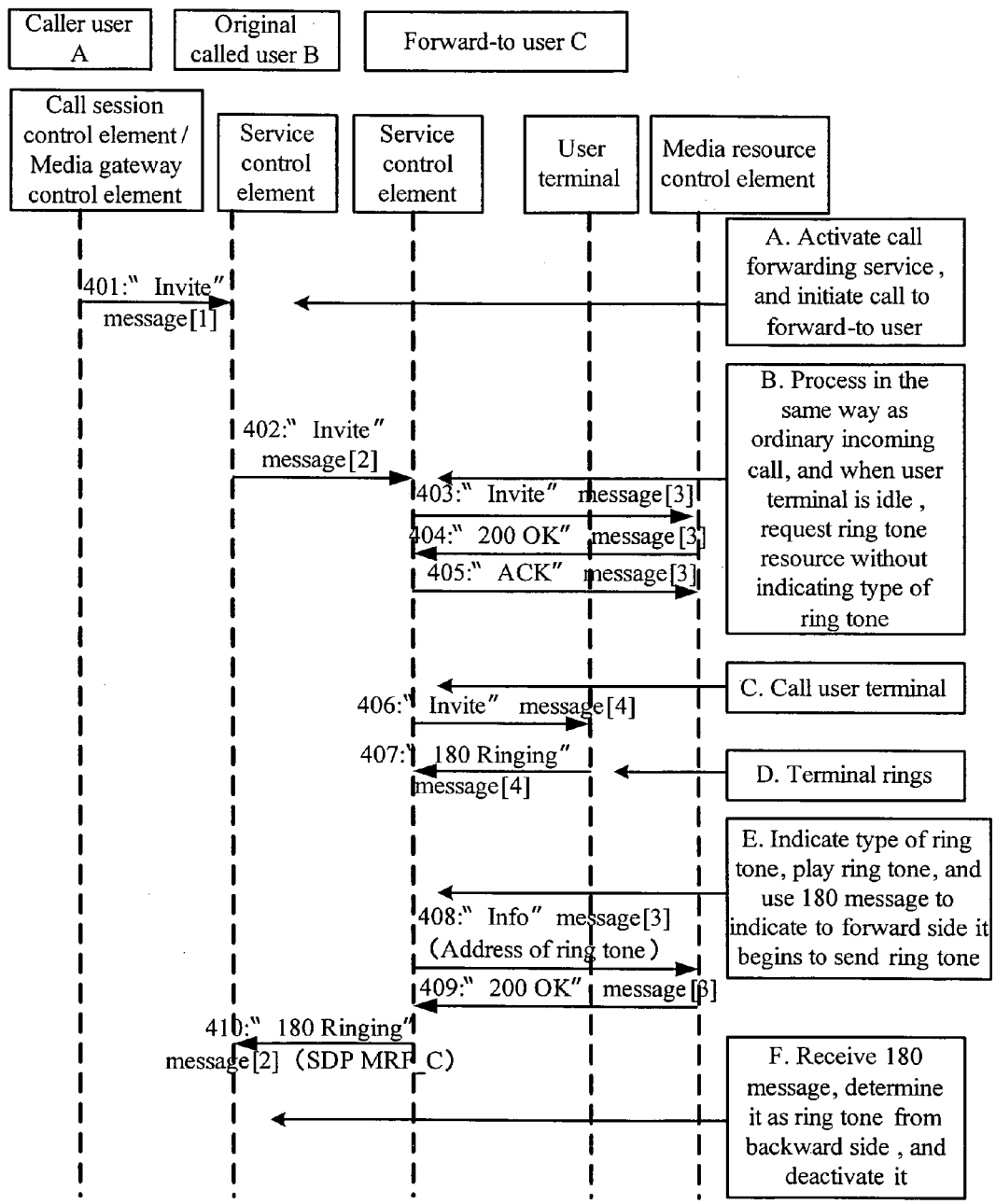
FIG. 4 is a flow chart of a method for implementing a ring back tone in the communication system according to a third embodiment of the invention.

The third embodiment of the invention is illustrated in FIG. 4. In step 401, a caller user A sends to a called user B an Invite message [1] initiating a call. The user A may be a user of a packet core network or a traditional circuit domain.

In step 402, the call arrives at the service control element of the user B, the call forwarding service is activated, and an Invite message [2] initiating a call is sent to the service control element of a forward-to user C.

In step 403, the service control element of the forward-to user C processes the call in the same way as an ordinary incoming call, and sends an Invite message [3] to the media resource control element. In the case of the user terminal being idle, a ring tone media resource is requested, but the specific type of the ring tone (i.e. the URL address of the ring tone) is not specified, so that the ring tone can not be played immediately upon success of the request.

In step 404, the media resource control element sends a 200 OK message [3] to the service control element.

In step 405, the service control element of the user C sends an ACK message [3] to the media resource control element.

In step 406, the service control element of the forward-to user C sends an Invite message [4] to the user terminal.

In step 407, the terminal of the user C rings, and returns a 180 Ringing message [4] to the service control element.

In step 408, the service control element of the user C indicates the address of the ring tone through an Info message [3] to the media resource control element to start playing.

In step 409, the media resource control element returns a 200 OK message [3] to the service control element.

In step 410, the service control element of the user C receives the 180 Ringing response message from the ringing called terminal, and due to the successful request for the ring tone media resource, sends to the forward side a 180 Ringing message [2] indicating that an idle terminal rings and a ring tone resource is played, and carrying the SDP description of the ring tone resource associated with the user C. Thereafter, the service control element of the original called user B receives the 180 Ringing message [2], and the subsequent steps are identical to steps 309 to 331 as illustrated in FIG. 3 and thus will not be described again.

In the embodiments illustrated in FIG. 3 and FIG. 4, the forward-to user is also a user of a packet core network. The invention is equally applicable to a case in which the forward-to user is not a user of a packet core network. Hereinafter, in a fourth embodiment of the invention, an example in which the forward-to user is a user of a traditional circuit domain is described.

Figure 5:
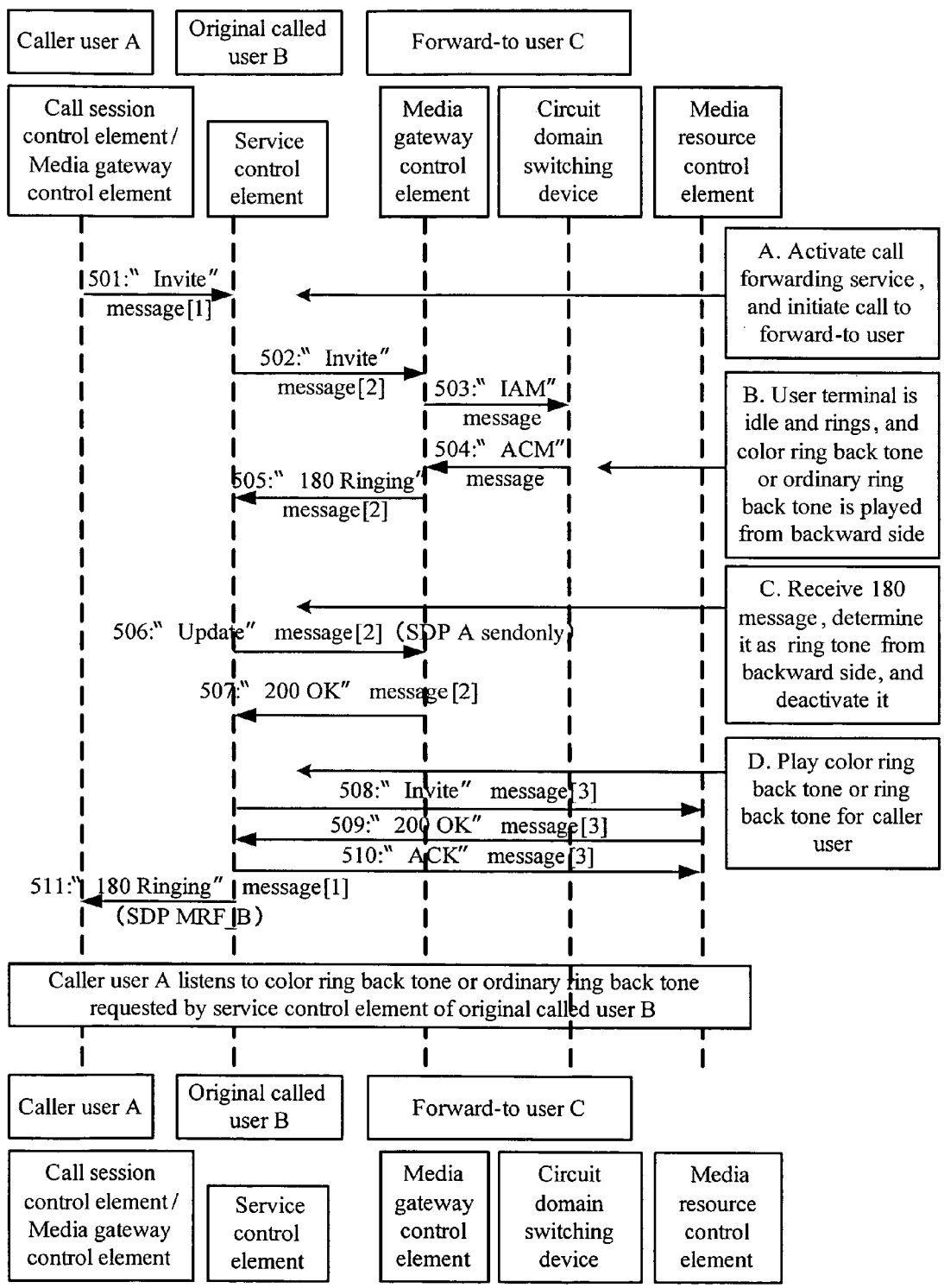
FIG. 5 is a flow chart of a method for implementing a ring back tone in the communication system according to a fourth embodiment of the invention.

The fourth embodiment of the invention is illustrated in FIG. 5. In step 501, a caller user A sends to a called user B an Invite message [1] initiating a call. The user A may be a user of a packet core network or a traditional circuit domain.

In step 502, the call arrives at the service control element of the original called user B, and the call forwarding service is activated. An Invite message [2] initiating the call is sent to the service control element of a forward-to user C.

In step 503, the media gateway control element receives the Invite message [2], and sends an Initial Address Message (IAM) message to a circuit-domain switching device, in the event that the forward-to user C is a user of a traditional circuit domain.

In step 504, the circuit-domain switching device is idle and rings, begins to play a color ring back tone or ordinary ring back tone, and feeds back an Address Complete Message (ACM) message to the media gateway control element.

In step 505, the media gateway control element translates the ACM message into a 180 Ringing message [2], which is sent to the forward side.

In step 506, when receiving the 180 Ringing message [2], the service control element of the original called user B understands that at the backward side, an idle terminal rings and the ring tone resource is played, and then the service control element of the original called user B deactivates the ring tone resource from the backward side, and sends to the media gateway control element an Update [2] message in which a media direction in the SDP for the caller user A is amended to "sendonly" indicating that the caller user only sends but does not receive a media stream, or "inactive" indicating that the caller user disables a media stream.

In step 507, the media gateway control element receives the Update message [2], and does not send to the caller user A a media stream of the ring tone resource from the traditional circuit domain, but returns a 200 OK message.

In step 508, the service control element of the original called user B sends to the media resource control element an Invite message [3] requesting for triggering a color ring back tone or ordinary ring back tone associated with the user B.

In step 509, the media resource control element sends a 200 OK answer message [3] to the service control element of the original called user B.

In step 510, the service control element of the original called user B returns an ACK message [3] to the media resource control element.

In step 511, the service control element of the original called user B sends to the caller user A a 180 Ringing message [1], also indicating that at the backward side, an idle terminal rings and a ring tone is played. However, what is carried in the message is the SDP description of the ring tone resource associated with the user B. The caller user receives the 180 Ringing response message [1], opens a media channel, and begins to listen to the color ring back tone or ordinary ring back tone requested by the service control element of the original called user B.

As known to those ordinarily skilled in the art, the caller user, the called user and the forward-to user may use the same or different types of terminals, such as a fixed phone, an ISDN terminal, a SIP terminal, an H.232 terminal, a Softphone, a GSM mobile phone, a CDMA mobile phone, a 3G mobile phone, a WLAN terminal and a PHS terminal. When the terminal of the caller user does not support the SIP, the network access node or the media gateway control element may perform the translation between a protocol supported by the terminal and the SIP, and when the terminal of the called user or the forward-to user does not support the SIP, the network access node may perform the translation between a protocol supported by the terminal and the SIP.

Hereinafter, the principle of the third solution according to the invention is described.

The service control element of a called user with which no call forwarding occurs or a user with which call forwarding occurs requests a ring tone resource from the media resource control element, and receives a final 200 OK answer response to a session initial request and sends it to the forward side, where in the Contact header, User Agent Capabilities of the user agent from which the message comes are described, for example, it is indicated that the message comes from a ring tone resource. The specific description may be made through but not limited to the following way:

description="<RBT>", where RBT (RingBackTone) is a protocol extension indicative of a ring tone resource.

The service control element of a user with which the call forwarding occurs parses the received final 200 OK message responding to the session initial request. If the User Agent Capabilities described in the Contact header indicate that it is a response from a ring tone resource, the ring tone resource from the backward side is deactivated. In the event that the service control element does not request for playing a ring tone resource for the caller user prior to initiation of the forwarded call (in other words, the call forwarding that occurs is not the Call Forwarding on No Reply), the media resource control unit is requested to play for the caller user a color ring back tone or ordinary ring back tone associated with the user. The ring tone resource from the backward side may be deactivated through but not limited to the following way.

A media direction in the SDP description for the caller user in a reInvite message or an Update message is amended. The media direction attribute is amended to be "sendonly" indicating that the caller user only sends but does not receive a media stream, or "inactive" indicating that the caller user disables a media stream.

Hereinafter, an embodiment according to the third solution of the invention is described.

Figure 6:
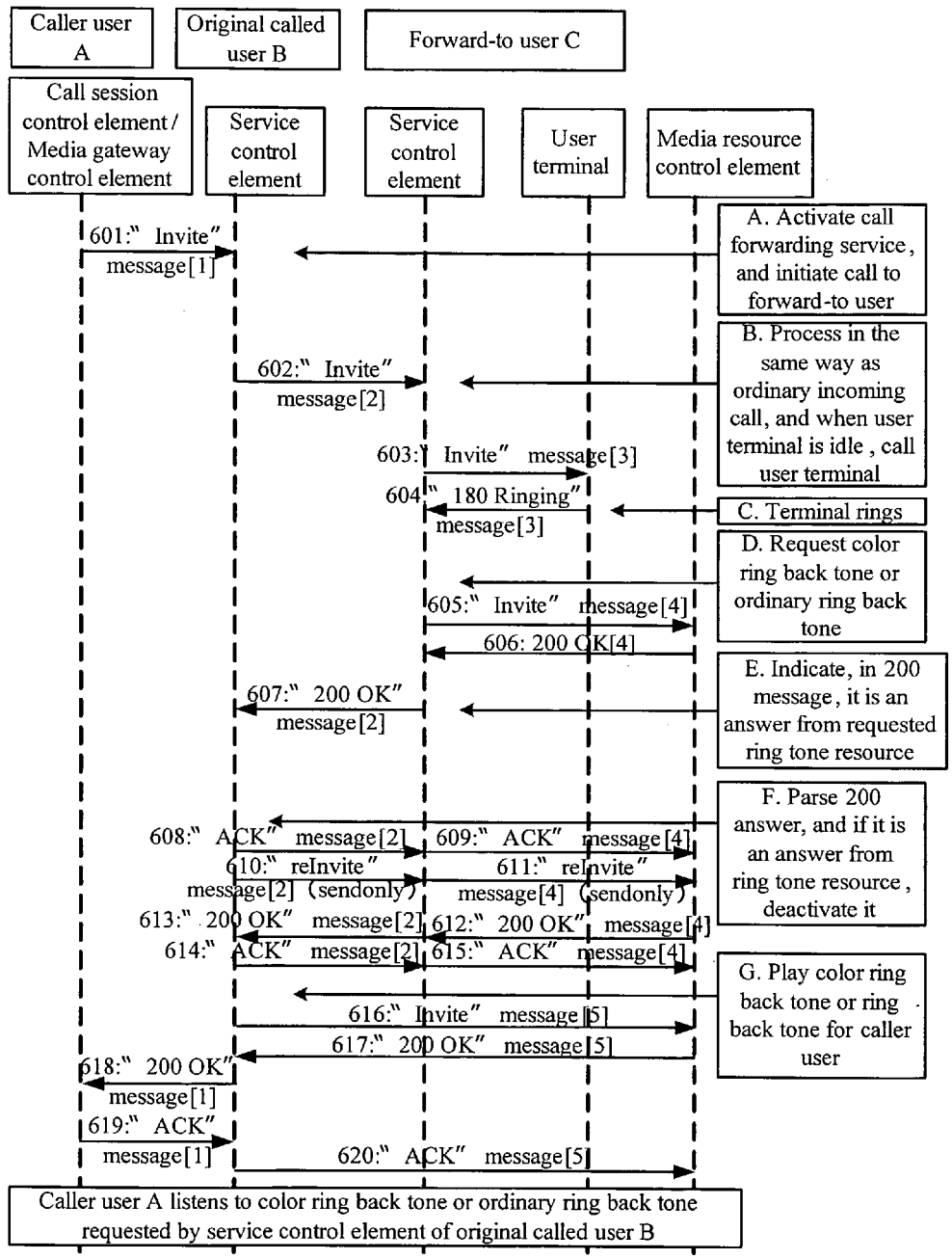
FIG. 6 is a flow chart of a method for implementing a ring back tone in the communication system according to a fifth embodiment of the invention.

A fifth embodiment of the invention is illustrated in FIG. 6. In steps 601 to 604, a caller user A initiates a call to a called user B, the call forwarding service is activated, and the call is initiated to a forward-to user C. The service control element of the forward-to user C processes the call in the same way as an ordinary incoming call. When the user terminal is idle, the service control element of the forward-to user C calls the user terminal and the user terminal rings. The signaling interaction is as followings. The caller user A sends an Invite message [1] to the original called user B, the service control element of the original called user B sends an Invite message [2] to the service control element of the forward-to user C, the service control element of the forward-to user C sends an Invite message [3] to the user terminal, and the user terminal feeds back a 180 Ringing message [3] to the service control element.

In step 605, the service control element of the user C sends to the media resource control element an Invite message [4] requesting a color ring back tone or ordinary ring back tone associated with the user C.

In step 606, the media resource control element responds with a 200 OK message [4].

In step 607, the service control element of the user C transfers to the forward side a 200 OK message [2] from the media resource control element, where in the Contact header User Agent Capabilities of the user agent from which the message comes are described, in other words, it is indicated that the message comes from a ring tone resource. The specific description may be made through but not limited to the following way: description="<RBT>", where RBT (RingBackTone) is a protocol extension indicative of a ring tone resource.

In step 608, the service control element of the original called user B parses the received 200 OK message [2], and in accordance with the User Agent Capabilities described in the Contact header, indicating that it is a response from a ring tone resource, deactivates the ring tone resource from the backward side, and also feeds back an ACK message [2] to the service control element of the forward-to user C.

In step 609, the service control element of the user C transfers an ACK message [4] to the media resource control element.

In steps 610 to 615, the service control element of the original called user B deactivates the ring tone resource requested from the backward side, a media direction in the SDP for the caller user A is amended in a reInvite message to "sendonly" indicating that the caller user only sends but does not receive a media stream, or "inactive" indicating that the caller user disables a media stream, and the media resource control element receives the message, and thus does not send to the caller user A a media stream from the ring tone resource. A specific signaling flow is as following. The service control element of the original called user B sends a reInvite message [2] to the service control element of the forward-to user C, the service control element of the forward-to user C sends a reInvite message [4] to the media resource control element, the media resource control element sends a 200 OK message [4] to the service control element, the service control element of the user C sends a 200 OK message [2] to the service control element of the user B, the service control element of the user B sends an ACK message [2] to the service control element of the user C, and the service control element of the user C sends an ACK message [4] to the media resource control element. Since the ring tone resource requested by the service control element of the forward-to user has been deactivated, only the ring tone resource of the called user is played for the caller user in the end, thus satisfying the service demand "regardless of how a call has been forwarded, when the call is put through, that is, a terminal of a forward-to user rings, the caller user can always hear a color ring back tone or an ordinary ring back tone triggered by the original called user until the call is answered for a talk or fails".

In steps 616 to 620, the service control element of the original called user B requests for triggering a color ring back tone or ordinary ring back tone associated with the user B, and plays it for the caller user A. A specific signaling flow is as illustrated: the service control element of the user B sends an Invite message [5] to the media resource control element, the media resource control element sends a 200 OK message [5] to the service control element of the original called user B, the service control element of the original called user B sends a 200 OK message [1] to the caller user A, the caller user A sends an ACK message [1] to the service control element of the original called user B, and the service control element of the original called user B sends an ACK message [5] to the media resource control element.

It shall be noted that in the embodiments according to the first and third solutions, the caller user A hears the color ring back tone or ordinary ring back tone after receiving the 200 OK response message responding to the Invite message.

In the second solution, the caller user A hears the color ring back tone or ordinary ring back tone after receiving the 180 Ringing response message, where an existing technology, referred to as Early Media, is used to allow a user to set up a media channel (for listening to a ring back tone or voice notification) before receiving an answer message, and the 180 Ringing response message may not be necessary. The specific details can be found in RFC 3959, RFC 3960 released by the Internet Engineering Task Force (IETF) and other relevant standards, and thus will not be described here.

As for the first and third solutions, the technology of Early Media may be also used to allow the caller user A to listen to a color ring back tone or ordinary ring back tone prior to an answer. For instance in the third solution, the indication in the Contact header, which describes that the User Agent Capabilities originate from a ring tone resource, may also be carried in a ring message or in another SIP response code indicative of the setting up of Early Media, in addition to being carried in an answer message.

The ideas of the first and third solutions according to the invention are to notify the backward side that no ring tone resource is to be requested and notify the forward side that User Agent Capabilities originate from a ring tone resource, for the purpose of restraining the ring tone resource from the backward side, so that the caller user hears the ring tone resource requested for the (original) called user. The use of an answer message or the technology of Early Media to allow the caller user to listen to the color ring back tone or ordinary ring back tone may have no effect on the applications of the two solutions. Therefore, an implementation flow of the two solutions using the technology of Early Media according to the invention will not be described here.

For convenient description, in the embodiments of the invention, a response message, a ring message and any other SIP response code indicative of the setting up of Early Media are collectively called as a media-setting-up response code.

The three solutions according to the invention have been described with reference to the numerous embodiments thereof. It shall be appreciated by those ordinarily skilled in the art that although those embodiments have been described in the case that the forwarding occurs once, they are applicable to a case that the forwarding occurs multiple times without any inventive effort, because the forwarding may be implemented identically for each time.

While the invention has been illustrated and described with reference to the certain embodiments thereof, it shall be appreciated by those ordinarily skilled in the art that various modifications can be made in the formalities and the details without departure from the spirit and scope of the invention.

What is claimed is:

1. A method for implementing a ring back tone in a communication system, wherein a packet core network of the communication system uses the Session Initiation Protocol as call control signaling, and a service control element provides various service logic control functions for a user, the method comprising:
   A) a service control element at a forward side, upon receiving a call request message from a caller user, issuing an instruction to reject a ring tone resource to a service control element at a backward side during interaction with the service control element at the backward side;
   B) the service control element at the backward side, upon receiving the call request message, if a user terminal is idle and permits a direct incoming call, sending a call request message to the user terminal, and requesting a ring tone resource from the media resource control element; and upon receiving a ring message from the user terminal and an answer response message indicative of a successful request for the ring tone resource, sending to the forward side a ring message representative of the ring tone resource; and
   C) the service control element at the forward side, upon receiving the ring message from the backward side, issuing an instruction to reject a ring tone resource to the service control element at the backward side, the instruction being an instruction to deactivate the ring tone resource from the backward side, and sending to the forward side a ring message.

2. The method for implementing a ring back tone in a communication system according to claim 1, further comprising: the service control element at the backward side before sending to the forward side the ring message,
   determining whether Session Description Protocol description of other media has been sent to the forward side, and if the Session Description Protocol description of other media has been sent to the forward side, amending for the forward side a remote media to be Session Description Protocol description of a ring tone resource requested by the local.

3. The method for implementing a ring back tone in a communication system according to claim 1, wherein the instruction to deactivate the ring tone resource from the backward side is implemented by:

the service control element at the forward side, sending to the backward side a message to amend a media direction in the Session Description Protocol description for the caller user, and amending a media direction attribute to indicate that the caller user only sends but does not receive a media stream, or indicate that the caller user disables a media stream.

4. The method for implementing a ring back tone in a communication system according to claim 1, further comprising:

the service control element at the backward side, upon receiving an answer response message from a non-ring tone resource media answering to the call request, transferring the answer response message to the forward side, thus establishing a session between the caller and a media.

5. The method for implementing a ring back tone in a communication system according to claim 4, wherein the answer response message from the non-ring tone resource media is one of:

a user answer, a voice mail answer and various voice notifications of incoming call failure.

6. The method for implementing a ring back tone III a communication system according to claim 4, further comprising: the service control element at the backward side, before transferring the answer response message from a non-ring tone resource media to the forward side, determining whether the Session Description Protocol description of other media has been sent to the forward side, and if the Session Description Protocol description of other media has been sent to the forward side, amending for the forward side the remote media to be Session Description Protocol description of the non-ring tone resource media.

7. The method for implementing a ring back tone in a communication system according to claim 1, wherein in step B, a service control element of a user that finally rings, upon receiving the call request message from the forward side, sends the call request message to the user, and then requests the ring tone resource from the media resource control element after receiving the ring message indicating that the terminal rings.

8. The method for implementing a ring back tone in a communication system according to claim 1, wherein in step B, a service control element of a user that finally rings, upon receiving the call request message from the forward side, a service control element of a user that finally rings requests the ring tone resource from the media resource control element, sends the call request message to the user after the ring tone resource has been requested successfully but without playing the requested ring tone resource, and plays the requested ring tone resource after receiving the ring message indicating that the terminal rings.

9. The method for implementing a ring back tone in a communication system according to claim 1, wherein the media control device of the caller user is a terminal, a network access node or a media gateway control element of the caller user.

10. A method for implementing a ring back tone in a communication system, wherein a packet core network of the communication system uses the Session Initiation Protocol as call control signaling, and a service control element provides various service logic control functions for a user, the method comprising:

a service control element at a forward side, upon receiving a call request message, issuing an instruction to reject a ring tone resource to a service control element at a backward side during interaction with the service control element at the backward side; and the service control element at the forward side, upon receiving a media-setting-up response code from the backward side, if no ring back tone is being played for a caller user, requesting a ring tone resource from a media resource control element, and playing a ring back tone for the caller user;

wherein issuing an instruction to reject a ring tone resource to the service control element at the backward side during interaction with the service control element at the backward side comprising:

the service control element at the backward side, upon succeeding in requesting a ring tone resource from the media resource control element after receiving a call request message from the forward side, sending to the forward side a media-setting-up response code in which a second flag is set indicative of a response from the ring tone resource; and the service control element at the forward side, parsing the received media-setting-up response code, determining whether the second flag is contained, and if the second flag is contained, issuing an instruction to reject a ring tone resource to the service control element at the backward side, the instruction being an instruction to deactivate the ring tone resource from the backward side.

11. The method for implementing a ring back tone in a communication system according to claim 10, wherein the second flag is set in a parameter in the media-setting-up response code indicating that User Agent Capabilities of a user agent, from which the message comes, originate from a ring tone resource.

12. The method for implementing a ring back tone in a communication system according to anyone of claim 10, wherein the instruction to deactivate the ring tone resource from the backward side is implemented by:

the service control element at the forward side, sending to the backward side a message to amend a media direction in the Session Description Protocol description for the caller user, and amending a media direction attribute to indicate that the caller user only sends but does not receive a media stream, or indicate that the caller user disables a media stream.

13. The method for implementing a ring back tone in a communication system according to anyone of claim 10, wherein the media control device of the caller user is a terminal, a network access node or a media gateway control element of the caller user.

14. The method for implementing a ring back tone in a communication system according to claim 10, wherein in the parsing the received media-setting-up response code:

the service control element at the forward side, upon receiving the media-setting-up response code, if no ring back tone is being played for the caller user, requesting the ring tone resource from the media resource control element, and playing a ring back tone for the caller user.

15. A system for implementing a ring back tone in a communication system, comprising a service control element at a forward side, a service control element at a backward side and a media resource control element, wherein the service control element at the forward side is adapted to receive a call request from a caller user, and issue an instruction to reject a ring tone resource to the service control element at the backward side during interaction with the service control element at the backward side;

the service control element at the backward side, upon receiving the call request message, if a user terminal is idle and permits a direct incoming call, is further adapted to send a call request message to the user terminal, and request a ring tone resource from the media resource control element; and upon receiving a ring message from the user terminal and an answer response message indicative of a successful request for the ring tone resource, sends to the service control element at the forward side a ring message representative of the ring tone resource; and the service control element at the forward side, upon receiving the ring message from the service control element at the backward side, is further adapted to issue an instruction to reject a ring tone resource to the service control element at the backward side, the instruction being an instruction to deactivate the ring tone resource from the service control element at the backward side, and send to the caller user a ring message.

* * * * *